(12) United States Patent
Williams (10) Patent No.: US 9,908,981 B2
(45) Date of Patent: Mar. 6, 2018

(54) POLYMER COMPOSITIONS AND ARTICLES MADE THEREFROM

(71) Applicant: ExxonMobil Chemical Patents Inc.

(72) Inventor: M. Glenn Williams, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 119 days.

(21) Appl. No.: 14/902,212

(22) PCT Filed: Aug. 20, 2014

(86) PCT No.: PCT/US2014/051866
§ 371 (c)(1),
(2) Date: Dec. 30, 2015

(87) PCT Pub. No.: WO2015/047604
PCT Pub. Date: Apr. 2, 2015

(65) Prior Publication Data
US 2016/0177042 A1 Jun. 23, 2016

Related U.S. Application Data

(60) Provisional application No. 61/884,484, filed on Sep. 30, 2013.

(51) Int. Cl.
| | | |
|---|---|---|
| C08J 5/18 | (2006.01) | |
| B32B 5/02 | (2006.01) | |
| B32B 27/08 | (2006.01) | |
| B32B 27/12 | (2006.01) | |
| B32B 27/32 | (2006.01) | |
| C08L 23/16 | (2006.01) | |
| B29C 47/00 | (2006.01) | |
| B29K 23/00 | (2006.01) | |
| B29K 105/00 | (2006.01) | |
| B29L 7/00 | (2006.01) | |

(52) U.S. Cl.
CPC ............ *C08J 5/18* (2013.01); *B29C 47/0004* (2013.01); *B29C 47/0021* (2013.01); *B32B 5/022* (2013.01); *B32B 27/08* (2013.01); *B32B 27/12* (2013.01); *B32B 27/32* (2013.01); *B32B 27/327* (2013.01); *C08L 23/16* (2013.01); *B29K 2023/10* (2013.01); *B29K 2105/0067* (2013.01); *B29L 2007/008* (2013.01); *B32B 2250/242* (2013.01); *B32B 2270/00* (2013.01); *B32B 2274/00* (2013.01); *B32B 2307/51* (2013.01); *B32B 2555/00* (2013.01); *C08J 2323/14* (2013.01); *C08J 2323/16* (2013.01); *C08J 2423/02* (2013.01); *C08J 2423/20* (2013.01); *C08J 2423/24* (2013.01)

(58) Field of Classification Search
CPC ...... C08J 5/18; C08J 2323/14; C08J 2323/16; C08J 2423/02; C08J 2423/20; C08J 2423/24; B29C 47/0004; B29C 47/0021; B32B 5/022; B32B 27/08; B32B 27/12; B32B 27/32; B32B 27/327; B32B 2250/242; B32B 2270/00; B32B 2274/00; B32B 2307/51; B32B 2555/00; C08L 23/16; B29K 2023/10; B29K 2105/0067; B29L 2007/008
See application file for complete search history.

(56) References Cited

U.S. PATENT DOCUMENTS

| | | |
|---|---|---|
| 3,149,178 A | 9/1964 | Hamilton et al. |
| 3,338,992 A | 8/1967 | Kinney |
| 3,341,394 A | 9/1967 | Kinney |
| 3,502,763 A | 3/1970 | Hartmann |
| 3,542,615 A | 11/1970 | Dobo et al. |
| 3,692,618 A | 9/1972 | Dorschner et al. |
| 3,802,817 A | 4/1974 | Matsuki et al. |
| 3,849,241 A | 11/1974 | Butin et al. |
| 4,340,563 A | 7/1982 | Appel et al. |
| 4,827,064 A | 5/1989 | Wu |
| 4,827,073 A | 5/1989 | Wu |
| 5,171,908 A | 12/1992 | Rudnick |
| 5,512,625 A | 4/1996 | Butterbach et al. |
| 5,783,531 A | 7/1998 | Andrew et al. |
| 6,002,064 A | 12/1999 | Kobylivker et al. |

(Continued)

FOREIGN PATENT DOCUMENTS

| | | | |
|---|---|---|---|
| WO | 98/39385 | 9/1998 | |
| WO | 2006/118807 | 11/2006 | |
| WO | 2009/035579 | 3/2009 | |
| WO | WO2013083461 | * 6/2013 | ............... C08J 5/18 |
| WO | 2013/158239 | 10/2013 | |

OTHER PUBLICATIONS

Cheng, "$^{13}$C NMR Analysis of Ethylene-Propylene-Rubbers", Macromolecules, vol. 17, No. 10, 1984, pp. 1950-1955.
Rudnick et al., "Synthetic Lubricants and High Performance Functional Fluids", (Marcel Dekker, 1999), pp. 3-52.
Wheeler et al., "Gel Permeation Cromatography/Fourier Transform Infrared Interface for Polymer Analysis", Applied Spectroscopy, 1993, vol. 47, pp. 1128-1130.
Chapman, B.R., et al. "Modification of PO-TPEs with a Fully Paraffinic Liquid Modifier", Rubber World, vol. 237, pp. 35-44, Oct. 2007.

*Primary Examiner* — Nathan M Nutter (57) ABSTRACT

Provided are blend compositions comprising a propylene-based elastomer and a polyalphaolefin. The blend compositions may be particularly useful in elastic film compositions, and especially useful as elastic film layers in nonwoven laminates. The film may comprise a blend of from about 0.5 to about 60 wt % of a polyalphaolefin and 40 to 99.5 wt % of a propylene-based elastomer. The film may comprise a blend of a propylene-base elastomer that comprises propylene and from 5 to 30 wt % of an α-olefin and a polyalphaolefin having a kinematic viscosity (KV) at 100° C. of from 3 to 3000 cSt.

19 Claims, 1 Drawing Sheet

(56) References Cited

U.S. PATENT DOCUMENTS

| | | |
|---|---|---|
| 6,268,203 B1 | 7/2001 | Johnson et al. |
| 6,525,157 B2 | 2/2003 | Cozewith et al. |
| 6,881,800 B2 | 4/2005 | Friedersdorf |
| 7,122,584 B2 | 10/2006 | Moriya et al. |
| 7,319,077 B2 | 1/2008 | Mehta et al. |
| 7,335,696 B2 | 2/2008 | Yalvac et al. |
| 7,645,829 B2 | 1/2010 | Tse et al. |
| 7,662,885 B2 | 2/2010 | Coffey et al. |
| 7,803,876 B2 | 9/2010 | Yeh et al. |
| 7,951,732 B2 | 5/2011 | Dharmarajan et al. |
| 8,013,069 B2 | 9/2011 | Harrington et al. |
| 8,026,323 B2 | 9/2011 | Datta et al. |
| 2001/0021458 A1 | 9/2001 | Campbell et al. |
| 2005/0095383 A1 | 5/2005 | Campbell et al. |
| 2006/0135699 A1 | 6/2006 | Li et al. |
| 2007/0167553 A1* | 7/2007 | Westwood et al. . C08L 23/0815 524/451 |
| 2009/0043049 A1 | 2/2009 | Chapman et al. |
| 2013/0053479 A1 | 2/2013 | Bond et al. |
| 2013/0281596 A1 | 10/2013 | Mohan et al. |
| 2014/0343230 A1* | 11/2014 | Ackermans et al. ...... C08J 5/18 525/240 |
| 2015/0030867 A1 | 1/2015 | German |
| 2016/0326357 A1 | 11/2016 | Dharmarajan et al. |

* cited by examiner

POLYMER COMPOSITIONS AND ARTICLES MADE THEREFROM

PRIORITY CLAIM TO RELATED APPLICATIONS

This application is a National Stage Application of International Application No. PCT/US2014/051866, filed Aug. 20, 2014, which claims the benefit of 61/884,484, filed Sep. 30, 2013, the disclosures of which are fully incorporated herein by reference in their entirety.

FIELD OF THE INVENTION

This invention relates to polymer compositions comprising propylene-based elastomers and polyalphaolefins, and to articles, such as films and fabrics, made therefrom.

BACKGROUND OF THE INVENTION

The use of various thermoplastic resins to make films and nonwoven fabrics is well known. In particular, propylene-based polymers and copolymers (sometimes referred to as propylene-based elastomers) are well known in the art for their usefulness in a variety of applications, including the manufacture of films and nonwoven fabrics. Such films and fabrics have a wide variety of uses, such as in medical and hygiene products. Elastic laminates, especially those used as diaper waist bands, leg cuffs, and elastic stretch engines, have been constructed from an elastic laminate that comprises a film inner layer with outer fabric or nonwoven facing layers.

In such elastic laminates, the extensibility of the laminate is typically governed to a large extent by the properties of the elastic film layer. For diaper applications there is a customer preference for a soft-stretch, where the laminate when extended shows a load that increases initially but remains relatively unchanged with additional extension. Soft-stretch laminates are particularly desirable for infant diaper applications, so that when an adult fastens the diaper on the infant they will not need to apply a high force to extend the elastic laminate.

Examples of elastic laminates include an inner film layer of an elastic styrenic block copolymer (SBC) compound laminated between facing layers of polypropylene based nonwoven fabrics. However, in such laminates the SBC layer is relatively incompatible with the PP facing layer. Therefore, adhesive tie layers are needed to provide a good bond between the facing fabric layers and the elastic film layers. However, adhesive tie layers increase the complexity of the lamination process and add overall cost to the production process.

U.S. Pat. No. 7,951,732 describes elastic laminates and articles that include one or more facing layers comprising thermoplastic resins and propylene-based polymer and one or more inner layers comprising propylene-based polymers.

EP Publication No. 0964890 describes elastomer compositions comprising a crystalline polyolefin, an elastomeric ethylene/alpha-olefin polymer, a plasticizer, and a material that provides an increase in wet coefficient of friction.

U.S. Patent Application Publication No. 2013/0053479 describes fibers formed from compositions comprising thermoplastic polymers and oils.

U.S. patent application Ser. No. 14/285,050 describes stretch-cling films comprising propylene-based elastomers and polyalphaolefins.

Additional background references include U.S. Pat. Nos. 7,122,584; 7,335,696; 7,662,885; 7,645,829; U.S. Patent Application Publication No. 2006/0135699, 2009/0043049, and 2013/0281596; and PCT Publication Nos. WO2006/118807 and WO2009/035579.

While the above references provide a variety of different polymers and films, none provide for an elastic laminate having the desired soft-stretch. Therefore, there is a need for elastic laminates having good soft-stretch and elasticity and that are constructed from compatible inner layer films and outer facing layers that do not require an adhesive tie layer therebetween.

SUMMARY OF THE INVENTION

Figure 1:
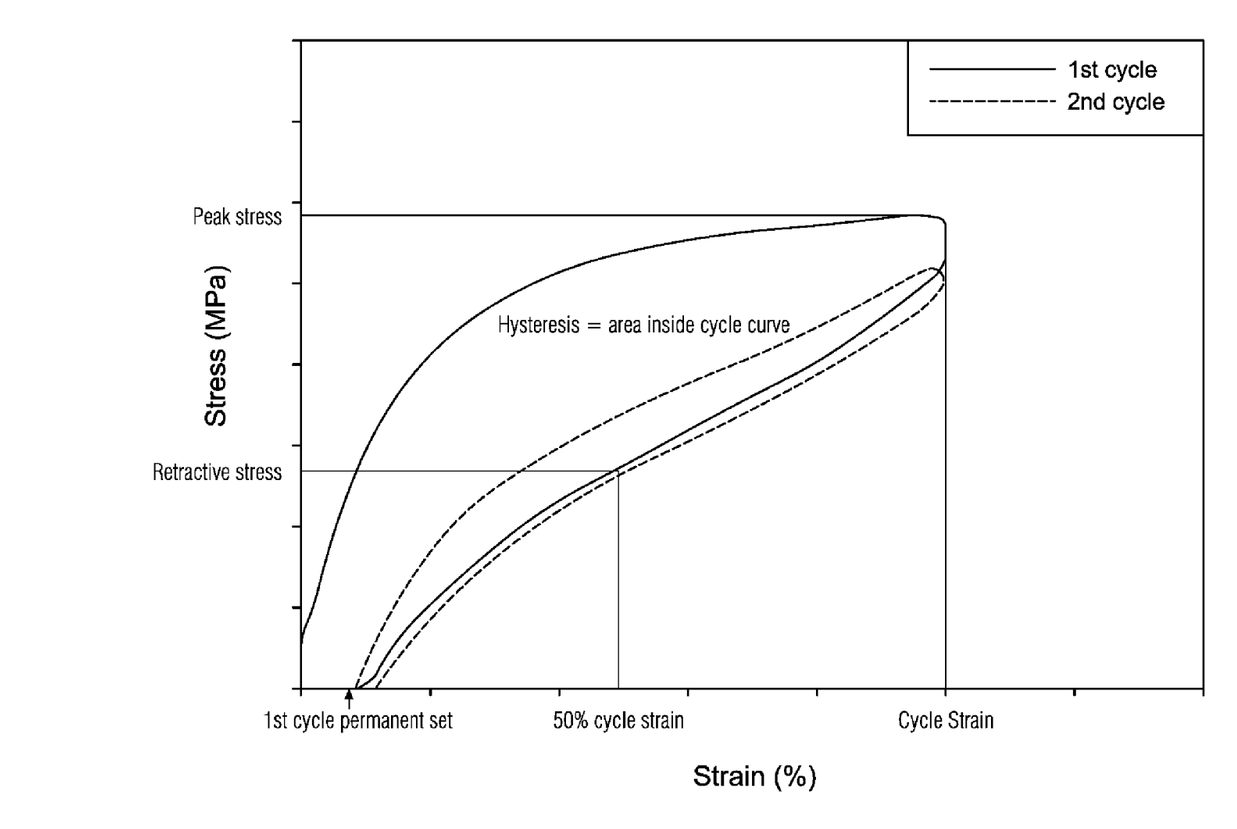
The FIGURE illustrates the response curves in the hysteresis cycle testing of the Examples.

Provided herein are blend compositions comprising a propylene-based elastomer and a polyalphaolefin. The blend compositions may be particularly useful in elastic film compositions, and especially useful as elastic film layers in nonwoven laminates.

The film may comprise a blend of from about 0.5 to about 60 wt % of a polyalphaolefin and 40 to 99.5 wt % of a propylene-based elastomer. The propylene-based polymer elastomer may be a reactor blend of a first polymer component and a second polymer component, where the first polymer component comprises propylene and an α-olefin and has an α-olefin content $R_1$ of from greater than 5 to less than 30 wt %, where the percentage by weight is based upon the total weight of the propylene-derived and α-olefin derived units of the first polymer component, and where the second polymer component comprises propylene and α-olefin and has an α-olefin content $R_2$ of from greater than 1 to less than 10 wt %, where the percentage by weight is based upon the total weight of the propylene-derived and α-olefin derived units of the second polymer component.

The film may comprise a blend of a propylene-base elastomer that comprises propylene and from 5 to 30 wt % of an α-olefin and wherein the propylene-base elastomer has a heat of fusion of less than about 75 J/g and a melt temperature of less than or equal to 120° C., and a polyalphaolefin where the polyalphaolefin has a kinematic viscosity (KV) at 100° C. of from 3 to 3000 cSt.

DETAILED DESCRIPTION OF THE INVENTION

Described herein are polymer blend compositions comprising propylene-based elastomers and polyalphaolefins. The blend compositions may be useful in making films, fibers, and nonwoven laminates and compositions. In particular, the blend compositions may be useful in making stretch films for hygiene laminate applications.

As used herein, the term "copolymer" is meant to include polymers having two or more monomers, optionally, with other monomers, and may refer to interpolymers, terpolymers, etc. The term "polymer" as used herein includes, but is not limited to, homopolymers, copolymers, terpolymers, etc., and alloys and blends thereof. The term "polymer" as used herein also includes impact, block, graft, random, and alternating copolymers. The term "polymer" shall further include all possible geometrical configurations unless otherwise specifically stated. Such configurations may include isotactic, syndiotactic and random symmetries. The term "blend" as used herein refers to a mixture of two or more polymers. The term "elastomer" shall mean any polymer exhibiting some degree of elasticity, where elasticity is the ability of a material that has been deformed by a force (such as by stretching) to return at least partially to its original dimensions once the force has been removed.

The term "monomer" or "comonomer," as used herein, can refer to the monomer used to form the polymer, i.e., the unreacted chemical compound in the form prior to polymerization, and can also refer to the monomer after it has been incorporated into the polymer, also referred to herein as a "[monomer]-derived unit". Different monomers are discussed herein, including propylene monomers, ethylene monomers, and diene monomers.

"Polypropylene," as used herein, includes homopolymers and copolymers of propylene or mixtures thereof. Products that include one or more propylene monomers polymerized with one or more additional monomers may be more commonly known as random copolymers (RCP) or impact copolymers (ICP). Impact copolymers may also be known in the art as heterophasic copolymers. "Propylene-based," as used herein, is meant to include any polymer comprising propylene, either alone or in combination with one or more comonomers, in which propylene is the major component (i.e., greater than 50 wt % propylene).

"Reactor grade," as used herein, means a polymer that has not been chemically or mechanically treated or blended after polymerization in an effort to alter the polymer's average molecular weight, molecular weight distribution, or viscosity. Particularly excluded from those polymers described as reactor grade are those that have been visbroken or otherwise treated or coated with peroxide or other prodegradants. For the purposes of this disclosure, however, reactor grade polymers include those polymers that are reactor blends.

"Reactor blend," as used herein, means a highly dispersed and mechanically inseparable blend of two or more polymers produced in situ as the result of sequential or parallel polymerization of one or more monomers with the formation of one polymer in the presence of another, or by solution blending polymers made separately in parallel reactors. Reactor blends may be produced in a single reactor, a series of reactors, or parallel reactors and are reactor grade blends. Reactor blends may be produced by any polymerization method, including batch, semi-continuous, or continuous systems. Particularly excluded from "reactor blend" polymers are blends of two or more polymers in which the polymers are blended ex situ, such as by physically or mechanically blending in a mixer, extruder, or other similar device.

"Visbreaking," as used herein, is a process for reducing the molecular weight of a polymer by subjecting the polymer to chain scission. The visbreaking process also increases the MFR of a polymer and may narrow its molecular weight distribution. Several different types of chemical reactions can be employed for visbreaking propylene-based polymers. An example is thermal pyrolysis, which is accomplished by exposing a polymer to high temperatures, e.g., in an extruder at 270° C. or higher. Other approaches are exposure to powerful oxidizing agents and exposure to ionizing radiation. The most commonly used method of visbreaking in commercial practice is the addition of a prodegradant to the polymer. A prodegradant is a substance that promotes chain scission when mixed with a polymer, which is then heated under extrusion conditions. Examples of prodegradants used in commercial practice are alkyl hydroperoxides and dialkyl peroxides. These materials, at elevated temperatures, initiate a free radical chain reaction resulting in scission of polypropylene molecules. The terms "prodegradant" and "visbreaking agent" are used interchangeably herein. Polymers that have undergone chain scission via a visbreaking process are said herein to be "visbroken." Such visbroken polymer grades, are often referred to in the industry as "controlled rheology" or "CR" grades.

"Catalyst system," as used herein, means the combination of one or more catalysts with one or more activators and, optionally, one or more support compositions. An "activator" is any compound or component, or combination thereof, capable of enhancing the ability of one or more catalysts to polymerize monomers to polymers.

As used herein, "nonwoven fabric" means a web structure of individual fibers or filaments that are interlaid, but not in an identifiable manner as in a knitted fabric.

Propylene-Based Elastomers

The polymer blends used to form the articles described herein comprise one or more propylene-based elastomers ("PBEs"). The PBE comprises propylene and from about 5 to about 30 wt % of one or more comonomers selected from ethylene and/or $C_4$-$C_{12}$ α-olefins. For example, the comonomer units may be derived from ethylene, butene, pentene, hexene, 4-methyl-1-pentene, octene, or decene. In preferred embodiments the comonomer is ethylene. In some embodiments, the propylene-based elastomer composition consists essentially of propylene and ethylene, or consists only of propylene and ethylene. The embodiments described below are discussed with reference to ethylene as the comonomer, but the embodiments are equally applicable to other copolymers with other α-olefin comonomers. In this regard, the copolymers may simply be referred to as propylene-based elastomers with reference to ethylene as the α-olefin.

The PBE may include at least about 5 wt %, at least about 6 wt %, at least about 7 wt %, at least about 8 wt %, at least about 9 wt %, at least about 10 wt %, at least about 12 wt %, or at least about 15 wt %, ethylene-derived units, where the percentage by weight is based upon the total weight of the propylene-derived and ethylene-derived units. The PBE may include up to about 30 wt %, up to about 25 wt %, up to about 22 wt %, up to about 20 wt %, up to about 19 wt %, up to about 18 wt %, or up to about 17 wt %, ethylene-derived units, where the percentage by weight is based upon the total weight of the propylene-derived and ethylene-derived units. In some embodiments, the PBE may comprise from about 5 to about 30 wt %, from about 6 to about 25 wt %, from about 7 wt % to about 20 wt %, from about 10 to about 19 wt %, from about 12 wt % to about 18 wt %, or from about 15 wt % to about 17 wt %, ethylene-derived units, where the percentage by weight is based upon the total weight of the propylene-derived and ethylene-derived units.

The PBE may include at least about 70 wt %, at least about 75 wt %, at least about 78 wt %, at least about 80 wt %, at least about 81 wt %, at least about 82 wt %, or at least about 83 wt %, propylene-derived units, where the percentage by weight is based upon the total weight of the propylene-derived and α-olefin derived units. The PBE may include up to about 95 wt %, up to about 94 wt %, up to about 93 wt %, up to about 92 wt %, up to about 91 wt %, up to about 90 wt %, up to about 88 wt %, or up to about 85 wt %, propylene-derived units, where the percentage by weight is based upon the total weight of the propylene-derived and α-olefin derived units.

The PBEs of one or more embodiments are characterized by a melting point (Tm), which can be determined by differential scanning calorimetry (DSC). For purposes herein, the maximum of the highest temperature peak is considered to be the melting point of the polymer. A "peak" in this context is defined as a change in the general slope of the DSC curve (heat flow versus temperature) from positive to negative, forming a maximum without a shift in the baseline where the DSC curve is plotted so that an endothermic reaction would be shown with a positive peak. The Tm of the PBE (as determined by DSC) may be less than about 120° C., less than about 115° C., less than about 110° C., or less than about 105° C.

The PBE may be characterized by its heat of fusion (Hf), as determined by DSC. The PBE may have an Hf that is at least about 0.5 J/g, at least about 1.0 J/g, at least about 1.5 J/g, at least about 3.0 J/g, at least about 4.0 J/g, at least about 5.0 J/g, at least about 6.0 J/g, or at least about 7.0 J/g. The PBE may be characterized by an Hf of less than about 75 J/g, or less than about 70 J/g, less than about 60 J/g, or less than about 50 J/g.

As used within this specification, DSC procedures for determining Tm and Hf are as follows. The polymer is pressed at a temperature of from about 200° C. to about 230° C. in a heated press, and the resulting polymer sheet is hung, under ambient conditions, in the air to cool. About 6 to 10 mg of the polymer sheet is removed with a punch die. This 6 to 10 mg sample is annealed at room temperature for about 80 to 100 hours. At the end of this period, the sample is placed in a DSC (Perkin Elmer Pyris One Thermal Analysis System) and cooled to about −30° C. to about −50° C. and held for 10 minutes at that temperature. The sample is then heated at 10° C./min to attain a final temperature of about 200° C. The sample is kept at 200° C. for 5 minutes. Then a second cool-heat cycle is performed, where the sample is cooled to about −30° C. to about −50° C. and held for 10 minutes at that temperature, and then re-heated at 10° C./min to a final temperature of about 200° C. Events from both cycles are recorded. The thermal output is recorded as the area under the melting peak of the sample, which typically occurs between about 0° C. and about 200° C. It is measured in Joules and is a measure of the Hf of the polymer.

The PBE can have a triad tacticity of three propylene units (mmm tacticity), as measured by 13C NMR, of 75% or greater, 80% or greater, 85% or greater, 90% or greater, 92% or greater, 95% or greater, or 97% or greater. In one or more embodiments, the triad tacticity may range from about 75 to about 99%, from about 80 to about 99%, from about 85 to about 99%, from about 90 to about 99%, from about 90 to about 97%, or from about 80 to about 97%. Triad tacticity is determined by the methods described in U.S. Pat. No. 7,232,871.

The PBE may have a tacticity index m/r ranging from a lower limit of 4 or 6 to an upper limit of 8 or 10 or 12. The tacticity index, expressed herein as "m/r", is determined by $^{13}C$ nuclear magnetic resonance ("NMR"). The tacticity index, m/r, is calculated as defined by H. N. Cheng in Vol. 17, MACROMOLECULES, pp. 1950-1955 (1984), incorporated herein by reference. The designation "m" or "r" describes the stereochemistry of pairs of contiguous propylene groups, "m" referring to meso and "r" to racemic. An m/r ratio of 1.0 generally describes a syndiotactic polymer, and an m/r ratio of 2.0 describes an atactic material. An isotactic material theoretically may have a ratio approaching infinity, and many by-product atactic polymers have sufficient isotactic content to result in ratios greater than 50.

The PBE may have a % crystallinity of from about 0.5% to about 40%, from about 1% to about 30%, or from about 5% to about 25%, determined according to DSC procedures. Crystallinity may be determined by dividing the Hf of a sample by the Hf of a 100% crystalline polymer, which is assumed to be 189 J/g for isotactic polypropylene.

The PBE may have a density of from about 0.84 g/cm³ to about 0.92 g/cm³, from about 0.85 g/cm³ to about 0.90 g/cm³, or from about 0.85 g/cm³ to about 0.87 g/cm³ at room temperature, as measured per the ASTM D-1505 test method.

The PBE can have a melt index (MI) (ASTM D-1238, 2.16 kg @ 190° C.), of less than or equal to about 100 g/10 min, less than or equal to about 50 g/10 min, less than or equal to about 25 g/10 min, less than or equal to about 10 g/10 min, less than or equal to about 8.0 g/10 min, less than or equal to about 5.0 g/10 min, or less than or equal to about 3.0 g/10 min.

The PBE may have a melt flow rate (MFR), as measured according to ASTM D-1238 (2.16 kg weight @ 230° C.), greater than about 0.5 g/10 min, greater than about 1.0 g/10 min, greater than about 1.5 g/10 min, greater than about 2.0 g/10 min, or greater than about 2.5 g/10 min. The PBE may have an MFR less than about 100 g/10 min, less than about 50 g/10 min, less than about 25 g/10 min, less than about 15 g/10 min, less than about 10 g/10 min, less than about 7 g/10 min, or less than about 5 g/10 min. In some embodiments, the PBE may have an MFR from about 0.5 to about 10 g/10 min, from about 1.0 to about 7 g/10 min, or from about 1.5 to about 5 g/10 min.

The PBE may have a g' index value of 0.95 or greater, or at least 0.97, or at least 0.99, wherein g' is measured at the Mw of the polymer using the intrinsic viscosity of isotactic polypropylene as the baseline. For use herein, the g' index is defined as:

$$g' = \frac{\eta_b}{\eta_l}$$

where $\eta_b$ is the intrinsic viscosity of the polymer and $\eta_l$ is the intrinsic viscosity of a linear polymer of the same viscosity-averaged molecular weight (Mv) as the polymer. $\eta_l = K M_v^\alpha$, K and α are measured values for linear polymers and should be obtained on the same instrument as the one used for the g' index measurement.

The PBE may have a weight average molecular weight (Mw), as measured by DRI, of from about 50,000 to about 1,000,000 g/mol, or from about 75,000 to about 500,000 g/mol, from about 100,000 to about 350,000 g/mol, from about 125,000 to about 300,000 g/mol, from about 150,000 to about 275,000 g/mol, or from about 200,000 to about 250,000 g/mol.

The PBE may have a number average molecular weight (Mn), as measured by DRI, of from about 5,000 to about 500,000 g/mol, from about 10,000 to about 300,000 g/mol, from about 50,000 to about 250,000 g/mol, from about 75,000 to about 200,000 g/mol, or from about 100,000 to about 150,000 g/mol.

The PBE may have a Z-average molecular weight (Mz), as measured by MALLS, of from about 50,000 to about 1,000,000 g/mol, or from about 75,000 to about 500,000 g/mol, or from about 100,000 to about 400,000 g/mol, from about 200,000 to about 375,000 g/mol, or from about 250,000 to about 350,000 g/mol.

The molecular weight distribution (MWD, equal to Mw/Mn) of the PBE may be from about 0.5 to about 20, from about 0.75 to about 10, from about 1.0 to about 5, from about 1.5 to about 4, or from about 1.8 to about 3.

Optionally, the propylene-based elastomer may also include one or more dienes. The term "diene" is defined as a hydrocarbon compound that has two unsaturation sites, i.e., a compound having two double bonds connecting carbon atoms. Depending on the context, the term "diene" as used herein refers broadly to either a diene monomer prior to polymerization, e.g., forming part of the polymerization medium, or a diene monomer after polymerization has begun (also referred to as a diene monomer unit or a diene-derived unit). Exemplary dienes include, but are not limited to, butadiene, pentadiene, hexadiene (e.g., 1,4-hexadiene), heptadiene (e.g., 1,6-heptadiene), octadiene (e.g., 1,6-octadiene, or 1,7-octadiene), nonadiene (e.g., 1,8-nonadiene), decadiene (e.g., 1,9-decadiene), undecadiene (e.g., 1,10-undecadiene), dodecadiene (e.g., 1,11-dodecadiene), tridecadiene (e.g., 1,12-tridecadiene), tetradecadiene (e.g., 1,13-tetradecadiene), pentadecadiene, hexadecadiene, and heptadecadiene. Examples of branched chain acyclic dienes include, but are not limited to, 5-methyl-1,4-hexadiene, 3,7-dimethyl-1,6-octadiene, and 3,7-dimethyl-1,7-octadiene. Examples of single ring alicyclic dienes include, but are not limited to 1,4-cyclohexadiene, 1,5-cyclooctadiene, and 1,7-cyclododecadiene. Examples of multi-ring alicyclic fused and bridged ring dienes include, but are not limited to tetrahydroindene; norbornadiene; methyltetrahydroindene; dicyclopentadiene; bicyclo(2.2.1)hepta-2,5-diene; and alkenyl-, alkylidene-, cycloalkenyl-, and cylcoalkylidene norbornenes [including, e.g., 5-methylene-2-norbornene, 5-ethylidene-2-norbornene, 5-propenyl-2-norbornene, 5-isopropylidene-2-norbornene, 5-(4-cyclopentenyl)-2-norbornene, 5-cyclohexylidene-2-norbornene, and 5-vinyl-2-norbornene]. Examples of cycloalkenyl-substituted alkenes include, but are not limited to vinyl cyclohexene, allyl cyclohexene, vinylcyclooctene, 4-vinylcyclohexene, allyl cyclodecene, vinylcyclododecene, and tetracyclododecadiene. In some embodiments, the diene is selected from 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; vinyl norbornene (VNB); dicyclopentadiene (DCPD), and combinations thereof. In embodiments where the propylene-based elastomer composition comprises a diene, the diene may be present at from 0.05 wt % to about 6 wt %, from about 0.1 wt % to about 5.0 wt %, from about 0.25 wt % to about 3.0 wt %, from about 0.5 wt % to about 1.5 wt %, diene-derived units, where the percentage by weight is based upon the total weight of the propylene-derived, α-olefin derived, and diene-derived units.

In one or more embodiments, the PBE can optionally be grafted (i.e., "functionalized") using one or more grafting monomers. As used herein, the term "grafting" denotes covalent bonding of the grafting monomer to a polymer chain of the PBE. The grafting monomer can be or include at least one ethylenically unsaturated carboxylic acid or acid derivative, such as an acid anhydride, ester, salt, amide, imide, acrylates or the like. Illustrative grafting monomers include, but are not limited to, acrylic acid, methacrylic acid, maleic acid, fumaric acid, itaconic acid, citraconic acid, mesaconic acid, maleic anhydride, 4-methyl cyclohexene-1,2-dicarboxylic acid anhydride, bicyclo(2.2.2)octene-2,3-dicarboxylic acid anhydride, 1,2,3,4,5,8,9,10-octahydronaphthalene-2,3-dicarboxylic acid anhydride, 2-oxa-1,3-diketospiro(4.4)nonene, bicyclo(2.2.1)heptene-2,3-dicarboxylic acid anhydride, maleopimaric acid, tetrahydrophthalic anhydride, norbornene-2,3-dicarboxylic acid anhydride, nadic anhydride, methyl nadic anhydride, himic anhydride, methyl himic anhydride, and 5-methylbicyclo(2.2.1)heptene-2,3-dicarboxylic acid anhydride. Other suitable grafting monomers include methyl acrylate and higher alkyl acrylates, methyl methacrylate and higher alkyl methacrylates, acrylic acid, methacrylic acid, hydroxymethyl methacrylate, hydroxyl-ethyl methacrylate and higher hydroxy-alkyl methacrylates and glycidyl methacrylate. Maleic anhydride is a preferred grafting monomer. In one or more embodiments, the grafted PBE comprises from about 0.5 to about 10 wt %, from about 0.5 to about 6 wt %, from about 0.5 to about 3 wt %, from about 1 to about 6 wt %, or from about 1 to about 3 wt %, ethylenically unsaturated carboxylic acid or acid derivative. In embodiments wherein the graft monomer is maleic anhydride, the maleic anhydride concentration in the grafted polymer is preferably in the range of about 1 to about 6 wt. %, at least about 0.5 wt %, or at least about 1.5 wt %.

In preferred embodiments, the PBE is a reactor grade polymer, as defined above. That is, in preferred embodiments, the propylene-based elastomer is a reactor blend of a first polymer component and a second polymer component. Thus, the comonomer content of the propylene-based elastomer can be adjusted by adjusting the comonomer content of the first polymer component, adjusting the comonomer content of second polymer component, and/or adjusting the ratio of the first polymer component to the second polymer component present in the propylene-based polymer composition.

The α-olefin content of the first polymer component ("$R_1$") may be greater than 5 wt % α-olefin, greater than 7 wt % α-olefin, greater than 10 wt % α-olefin, greater than 12 wt % α-olefin, greater than 15 wt % α-olefin, or greater than 17 wt % α-olefin, where the percentage by weight is based upon the total weight of the propylene-derived and α-olefin-derived units of the first polymer component. The α-olefin content of the first polymer component may be less than 30 wt % α-olefin, less than 27 wt % α-olefin, less than 25 wt % α-olefin, less than 22 wt % α-olefin, less than 20 wt % α-olefin, or less than 19 wt % α-olefin, where the percentage by weight is based upon the total weight of the propylene-derived and α-olefin-derived units of the first polymer component. In some embodiments, the α-olefin content of the first polymer component may range from 5 wt % to 30 wt % α-olefin, from 7 wt % to 27 wt % α-olefin, from 10 wt % to 25 wt % α-olefin, from 12 wt % to 22 wt % α-olefin, from 15 wt % to 20 wt % α-olefin, or from 17 wt % to 19 wt % α-olefin. Preferably, the first polymer component comprises propylene and ethylene.

The α-olefin content of the second polymer component ("$R_2$") may be greater than 1.0 wt % α-olefin, greater than 1.5 wt % α-olefin, greater than 2.0 wt % α-olefin, greater than 2.5 wt % α-olefin, greater than 2.75 wt % α-olefin, or greater than 3.0 wt % α-olefin, where the percentage by weight is based upon the total weight of the propylene-derived and α-olefin derived units of the second polymer component. The α-olefin content of the second polymer component may be less than 10 wt % α-olefin, less than 9 wt % α-olefin, less than 8 wt % α-olefin, less than 7 wt % α-olefin, less than 6 wt % α-olefin, or less than 5 wt % α-olefin, where the percentage by weight is based upon the total weight of the propylene-derived and α-olefin-derived units of the second polymer component. In some embodiments, the α-olefin content of the second polymer component may range from 1.0 wt % to 10 wt % α-olefin, or from 1.5 wt % to 9 wt % α-olefin, or from 2.0 wt % to 8 wt % α-olefin, or from 2.5 wt % to 7 wt % α-olefin, or from 2.75 wt % to 6 wt % α-olefin, or from 3 wt % to 5 wt % α-olefin. Preferably, the second polymer component comprises propylene and ethylene.

Preferably, the PBE comprises from 1 to 25 wt % of the second polymer component, from 3 to 20 wt % of the second polymer component, from 5 to 18 wt % of the second polymer component, from 7 to 15 wt % of the second polymer component, or from 8 to 12 wt % of the second polymer component, based on the weight of the propylene-based elastomer. The PBE may comprise from 75 to 99 wt % of the first polymer component, from 80 to 97 wt % of the first polymer component, from 85 to 93 wt % of the first polymer component, or from 82 to 92 wt % of the first polymer component, based on the weight of the propylene-based elastomer.

Preparation of Propylene-Based Elastomers

The propylene-based elastomer may be prepared by any suitable means as known in the art. For example, the propylene-based elastomer may be prepared by reacting monomers in the presence of a catalyst system described herein at a temperature of from 0° C. to 200° C. for a time of from 1 second to 10 hours. Preferably, homogeneous conditions are used, such as a continuous solution process or a bulk polymerization process with excess monomer used as diluent. The continuous process may use some form of agitation to reduce concentration differences in the reactor and maintain steady state polymerization conditions. The heat of the polymerization reaction is preferably removed by cooling of the polymerization feed and allowing the polymerization to heat up to the polymerization, although internal cooling systems may be used. Further description of exemplary methods suitable for preparation of the PBEs described herein may be found in U.S. Pat. Nos. 6,881,800; 7,803,876; 8,013,069; and 8,026,323.

The triad tacticity and tacticity index of the PBE may be controlled by the catalyst, which influences the stereoregularity of propylene placement, the polymerization temperature, according to which stereoregularity can be reduced by increasing the temperature, and by the type and amount of a comonomer, which tends to reduce the level of longer propylene derived sequences. Too much comonomer may reduce the crystallinity provided by the crystallization of stereoregular propylene derived sequences to the point where the material lacks strength; too little and the material may be too crystalline. The comonomer content and sequence distribution of the polymers can be measured using $^{13}C$ nuclear magnetic resonance (NMR) by methods well known to those skilled in the art. Comonomer content of discrete molecular weight ranges can be measured using methods well known to those skilled in the art, including Fourier Transform Infrared Spectroscopy (FTIR) in conjunction with samples by GPC, as described in Wheeler and Willis, Applied Spectroscopy, 1993, Vol. 47, pp. 1128-1130. For a propylene ethylene copolymer containing greater than 75 wt % propylene, the comonomer content (ethylene content) of such a polymer can be measured as follows: A thin homogeneous film is pressed at a temperature of about 150° C. or greater, and mounted on a Perkin Elmer PE 1760 infrared spectrophotometer. A full spectrum of the sample from 600 cm-1 to 4000 cm-1 is recorded and the monomer weight percent of ethylene can be calculated according to the following equation: Ethylene wt %=82.585−111.987X+30.045X2, where X is the ratio of the peak height at 1155 cm-1 and peak height at either 722 cm-1 or 732 cm-1, whichever is higher. For propylene ethylene copolymers having 75 wt % or less propylene content, the comonomer (ethylene) content can be measured using the procedure described in Wheeler and Willis. Reference is made to U.S. Pat. No. 6,525,157, whose test methods are also fully applicable for the various measurements referred herein and which contains more details on GPC measurements, the determination of ethylene content by NMR and the DSC measurements.

The catalyst may also control the stereoregularity in combination with the comonomer and the polymerization temperature. The PBEs described herein are prepared using one or more catalyst systems. As used herein, a "catalyst system" comprises at least a transition metal compound, also referred to as catalyst precursor, and an activator. Contacting the transition metal compound (catalyst precursor) and the activator in solution upstream of the polymerization reactor or in the polymerization reactor of the disclosed processes yields the catalytically active component (catalyst) of the catalyst system. Such catalyst systems may optionally include impurity scavengers.

The catalyst systems used for producing the PBE may comprise a metallocene compound. In some embodiments, the metallocene compound is a bridged bisindenyl metallocene having the general formula $(In^1)Y(In^2)MX_2$, where $In^1$ and $In^2$ are the same or different, and are substituted or unsubstituted indenyl groups bound to M and bridged by Y, Y is a bridging group in which the number of atoms in the direct chain connecting with $In^2$ is from 1 to 8 and the direct chain comprises C or Si, and M is a Group 3, 4, 5, or 6 transition metal. $In^1$ and $In^2$ may be substituted or unsubstituted. If $In^1$ and $In^2$ are substituted by one or more substituents, the substituents are selected from the group consisting of a halogen atom, $C_1$ to $C_{10}$ alkyl, $C_5$ to $C_{15}$ aryl, $C_6$ to $C_{25}$ alkylaryl, and N- or P-containing alkyl or aryl. Exemplary metallocene compounds include, but are not limited to, μ-dimethyl-silylbis(indenyl)hafniumdimethyl, μ-dimethylsilylbis(indenyl)zirconiumdimethyl, (μ-dimethyl-silyl)bis(2-methyl-4-(3,'5'-di-tert-butylphenyl)indenyl)zirconiumdimethyl, (μ-dimethyl-silyl)bis(2-methyl-4-(3,'5'-di-tert-butylphenyl)indenyl)hafniumdimethyl, (μ-dimethyl-silyl)bis(2-methyl-4-naphthylindenyl)zirconiumdimethyl, methylsilyl)bis(2-methyl-4-naphthylindenyl) hafniumdimethyl, (μ-dimethylsilyl)bis(2-methyl-4-(N-carbazyl)indenyl)-zirconiumdimethyl, and (μ-dimethylsilyl)bis(2-methyl-4-(N-carbazyl)indenyl)-hafniumdimethyl.

Alternatively, the metallocene compound may correspond to one or more of the formulas disclosed in U.S. Pat. No. 7,601,666. Such metallocene compounds include, but are not limited to, dimethylsilyl bis(2-(methyl)-5,5,8,8-tetramethyl-5,6,7,8-tetrahydrobenz(f)indenyl)hafnium dimethyl, diphenylsilyl bis(2-(methyl)-5,5,8,8-tetramethyl-5,6,7,8-tetrahydrobenz(f)indenyl)-hafnium dimethyl, diphenylsilyl bis (5,5,8,8-tetramethyl-5,6,7,8-tetrahydrobenz(f)indenyl)-hafnium dimethyl, diphenylsilyl bis(2-(methyl)-5,5,8,8-tetramethyl-5,6,7,8-tetrahydrobenz(f) indenyl)zirconium dichloride, and cyclo-propylsilyl bis(2-(methyl)-5,5,8,8-tetramethyl-5,6,7,8-tetrahydrobenz(f) indenyl)hafnium dimethyl.

The activators of the catalyst systems used to produce PBE may comprise a cationic component. In some embodiments, the cationic component has the formula $[R^1R^2R^3AH]^+$, where A is nitrogen, $R^1$ and $R^2$ are together a $-(CH_2)_a-$ group, where a is 3, 4, 5 or 6 and form, together with the nitrogen atom, a 4-, 5-, 6- or 7-membered non-aromatic ring to which, via adjacent ring carbon atoms, optionally, one or more aromatic or heteroaromatic rings may be fused, and $R^3$ is $C_1$, $C_2$, $C_3$, $C_4$ or $C_5$ alkyl, or N-methylpyrrolidinium or N-methylpiperidinium. In other embodiments, the cationic component has the formula $[R_aAH]^+$, where A is nitrogen, n is 2 or 3, and all R are identical and are $C_1$ to $C_3$ alkyl groups, such as, for example, trimethylammonium, trimethylanilinium, triethylammonium, dimethylanilinium, or dimethylammonium.

In one or more embodiments, the activators of the catalyst systems used to produce the PBE comprise an anionic component, $[Y]^-$. In some embodiments, the anionic component is a non-coordinating anion (NCA), having the formula $[B(R^4)_4]^-$, where $R^4$ is an aryl group or a substituted aryl group, of which the one or more substituents are identical or different and are selected from the group consisting of alkyl, aryl, a halogen atom, halogenated aryl, and haloalkylaryl groups. In one or more embodiments, the substituents are perhalogenated aryl groups, or perfluorinated aryl groups, including but not limited to perfluorophenyl, perfluoronaphthyl and perfluorobiphenyl.

Together, the cationic and anionic components of the catalysts systems described herein form an activator compound. In one or more embodiments, the activator may be N,N-dimethylanilinium-tetra(perfluorophenyl)borate, N,N-dimethylanilinium-tetra(perfluoronaphthyl)borate, N,N-dimethylanilinium-tetrakis(perfluoro-biphenyl)borate, N,N-dimethylanilinium-tetrakis(3,5-bis(trifluoromethyl)phenyl) borate, triphenylcarbenium-tetra(perfluorophenyl)borate, triphenylcarbenium-tetra(perfluoro-naphthyl)borate, triphenylcarbenium-tetrakis(perfluorobiphenyl)borate, or triphenylcarbenium-tetrakis(3,5-bis(trifluoromethyl)phenyl)borate.

Any catalyst system resulting from any combination of a metallocene compound, a cationic activator component, and an anionic activator component mentioned in the preceding paragraphs shall be considered to be explicitly disclosed herein and may be used in accordance with the present invention in the polymerization of one or more olefin monomers. Also, combinations of two different activators can be used with the same or different metallocene(s).

Further, the catalyst systems may contain, in addition to the transition metal compound and the activator described above, additional activators (co-activators) and/or scavengers. A co-activator is a compound capable of reacting with the transition metal complex, such that when used in combination with an activator, an active catalyst is formed. Co-activators include alumoxanes and aluminum alkyls.

In some embodiments, scavengers may be used to "clean" the reaction of any poisons that would otherwise react with the catalyst and deactivate it. Typical aluminum or boron alkyl components useful as scavengers are represented by the general formula $R^xJZ_2$ where J is aluminum or boron, $R^x$ is a $C_1$-$C_{20}$ alkyl radical, for example, methyl, ethyl, propyl, butyl, pentyl, and isomers thereof, and each Z is independently $R^x$ or a different univalent anionic ligand such as halogen (Cl, Br, I), alkoxide ($OR^x$) and the like. Exemplary aluminum alkyls include triethylaluminum, diethylaluminum chloride, ethylaluminum dichloride, tri-iso-butylaluminum, tri-n-octylaluminum, tri-n-hexylaluminum, trimethylaluminum and combinations thereof. Exemplary boron alkyls include triethylboron. Scavenging compounds may also be alumoxanes and modified alumoxanes including methylalumoxane and modified methylalumoxane.

Polyalphaolefin

In general polyalphaolefins (PAOs) are oligomers of α-olefins (also known as 1-olefins) and are often used as the base stock for synthetic lubricants. PAOs are typically produced by the polymerization of α-olefins, preferably linear α-olefins. A PAO may be characterized by any type of tacticity, including isotactic or syndiotactic and/or atactic, and by any degree of tacticity, including isotactic-rich or syndiotactic-rich or fully atactic. PAO liquids are described in, for example, U.S. Pat. Nos. 3,149,178; 4,827,064; 4,827,073; 5,171,908; and 5,783,531; and in SYNTHETIC LUBRICANTS AND HIGH-PERFORMANCE FUNCTIONAL FLUIDS, Leslie R. Rudnick & Ronald L. Shubkin, eds. (Marcel Dekker, 1999), pp. 3-52. PAOs are Group 4 compounds, as defined by the American Petroleum Institute (API).

Useful PAOs may be made by any suitable means known in the art. For example, the PAOs may be prepared by the oligomerization of an α-olefin in the presence of a polymerization catalyst, such as a Friedel-Crafts catalyst (including, for example, $AlCl_3$, $BF_3$, and complexes of $BF_3$ with water, alcohols, carboxylic acids, or esters), a coordination complex catalyst (including, for example, the ethylaluminum sesquichloride+$TiCl_4$ system), or a homogeneous or heterogeneous (supported) catalyst more commonly used to make polyethylene and/or polypropylene (including, for example, Ziegler-Natta catalysts, metallocene or other single-site catalysts, and chromium catalysts). Subsequent to the polymerization, the PAO may be hydrogenated in order to reduce any residual unsaturation. PAO's may be hydrogenated to yield substantially (>99 wt. %) paraffinic materials. The PAO's may also be functionalized to comprise, for example, esters, polyethers, polyalkylene glycols, and the like.

The percentage of carbons in chain-type paraffinic structures ($C_P$) is close to 100% (typically greater than 98% or even 99%) for PAOs.

In general, PAOs are high purity hydrocarbons with a paraffinic structure and a high-degree of side-chain branching. The PAO may have irregular branching or regular branching. The PAO may comprise oligomers or low molecular weight polymers of branched and/or linear alpha olefins. In some embodiments, the PAO comprises $C_6$ to $C_{2000}$, or $C_8$ to $C_{1500}$, or $C_{10}$ to $C_{1000}$, or $C_{15}$ to $C_{800}$, or $C_{20}$ to $C_{400}$, or $C_{30}$ to $C_{250}$ oligomers of α-olefins. These oligomers may be dimers, trimers, tetramers, pentamers, etc. In some embodiments, the PAO comprises $C_2$ to $C_{24}$, preferably $C_5$ to $C_{18}$, more preferably $C_6$ to $C_{14}$, even more preferably $C_8$ to $C_{12}$, most preferably $C_{10}$ branched or linear α-olefins. In some embodiments, the PAO comprises $C_3$ to $C_{24}$, preferably $C_5$ to $C_8$, more preferably $C_6$ to $C_{14}$, most preferably $C_8$ to $C_{12}$ linear α-olefins (LAOs). Suitable olefins include 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, and blends thereof. Oligomers of LAOs with only even carbon numbers between 6 and 18 (inclusive) are particularly preferred. Preferably $C_2$, $C_3$, and $C_4$ α-olefins (i.e., ethylene, propylene and 1-butene and/or isobutylene) are present in the PAO oligomers at an average concentration of 30 wt % or less, or 20 wt % or less, or 10 wt % or less, or 5 wt % or less; more preferably $C_2$, $C_3$, and $C_4$ α-olefins are not present in the PAO oligomers. Useful PAOs are described more particularly in, for example, U.S. Pat. Nos. 5,171,908 and 5,783,531, both of which are herein incorporated by reference.

In some embodiments, a single LAO is used to prepare the oligomers. For example, the PAO may be formed by the oligomerization of 1-decene, and the PAO is a mixture of oligomers (including, for example, dimers, trimers, tetramers, pentamers, and higher) of 1-decene.

In some embodiments, the PAO may comprise a blend of oligomers of two or more $C_3$ to $C_{18}$ LAOs (preferably $C_5$ to $C_{18}$ LAOs), to make 'bipolymer' or 'terpolymer' or higher-order copolymer combinations, provided that $C_3$ and $C_4$

LAOs are present at 10 wt % or less. For example, a preferred embodiment involves the oligomerization of a mixture of 1-octene, 1-decene, and 1-dodecene, and the PAO is a mixture of oligomers (for example, dimers, trimers, tetramers, pentamers, and higher) of 1-octene/1-decene/1-dodecene 'terpolymer'.

In some embodiments, the PAO comprises oligomers of a single α-olefin species having a carbon number of 5 to 24 (preferably 6 to 18, preferably 8 to 12, most preferably 10). In some embodiments, the PAO comprises oligomers of mixed α-olefins (i.e., involving two or more α-olefin species), each α-olefin having a carbon number of 3 to 24 (preferably 5 to 24, preferably 6 to 18, most preferably 8 to 12), provided that α-olefins having a carbon number of 3 or 4 are present at 10 wt % or less. In a particularly preferred embodiment, the PAO comprises oligomers of mixed α-olefins (i.e., involving two or more α-olefin species) where the weighted average carbon number for the α-olefin mixture is 6 to 14 (preferably 8 to 12, preferably 9 to 11).

In another embodiment, the PAO comprises oligomers of one or more α-olefin with repeat unit formulas of:

—[CHR—CH$_2$]— where R is a C$_3$ to C$_{18}$ saturated hydrocarbon branch. Preferably R is constant for all oligomers. In another embodiment, there is a range of R substituents covering carbon numbers from 3 to 18. Preferably R is linear, i.e., R is (CH$_2$)$_z$CH$_3$, where z is 2 to 17 (preferably 3 to 11, preferably 4 to 9).

Optionally, R may contain one methyl or ethyl branch, i.e.,

R is (CH$_2$)$_m$[CH(CH$_3$)](CH$_2$)$_n$CH$_3$ or (CH$_2$)$_x$[CH(CH$_2$CH$_3$)](CH$_2$)$_y$CH$_3$, where (m+n) is 1 to 15 (preferably 1 to 9, preferably 3 to 7) and (x+y) is 1 to 14 (preferably 1 to 8, preferably 2 to 6). Preferably m>n. Preferably m is 0 to 15 (preferably 2 to 15, preferably 3 to 12, preferably 4 to 9) and n is 0 to 10 (preferably 1 to 8, preferably 1 to 6, preferably 1 to 4). Preferably x>y. Preferably x is 0 to 14 (preferably 1 to 14, preferably 2 to 11, preferably 3 to 8) and y is 0 to 10 (preferably 1 to 8, preferably 1 to 6, preferably 1 to 4). Preferably the repeat units are arranged in a head-to-tail fashion with minimal heat-to-head connections.

The PAO may be atactic, isotactic, or syndiotactic. In one embodiment, the PAO has essentially the same population of meso [m] and racemic [r] dyads (preferably neither [m] nor [r] greater than 60%, preferably neither greater than 55%) as measured by $^{13}$C-NMR, making it atactic. In another embodiment, the PAO has more than 60% (preferably more than 70%, preferably more than 80%, preferably more than 90%) meso dyads [m]. In another embodiment, the PAO has more than 60% (preferably more than 70%, preferably more than 80%, preferably more than 90%) racemic dyads [r]. In one embodiment, [m]/[r] determined by $^{13}$C-NMR is between 0.9 and 1.1 in one embodiment, [m]/[r] is greater than 1 in another embodiment, and [m]/[r] is less than 1 in yet another embodiment.

Preferred PAOs have a "branching ratio" as defined in U.S. Pat. No. 4,827,064 and measured according to the method described therein, of 0.20 or less, preferably 0.19 or less, preferably 0.18 or less, preferably 0.17 or less, preferably 0.15 or less, preferably 0.12 or less, preferably 0.10 or less.

The PAO may have a number average molecular weight (M$_n$) in the range of 1.00×10$^2$ to 2.10×10$^4$ g/mol or 3.00×10$^2$ to 1.50×10$^4$ g/mol, or in the range of 2.00×10$^2$ to 1.00×10$^4$, or 2.00×10$^2$ to 7.00×10$^3$, or 6.00×10$^2$ to 3.00×10$^3$, or 2.00×10$^2$ to 2.00×10$^3$, or 2.00×10$^2$-5.00×10$^2$ g/mol.

The PAOs may have a weight average molecular weight (M$_w$) of less than 10,000 g/mol, or less than 5,000 g/mol, or less than 4,000 g/mol, or less than 2,000 g/mol, or less than 1,000 g/mol. In some embodiments, the PAO may have an M$_w$ of 250 g/mol or more, 400 g/mol or more, or 500 g/mol or more, or 600 g/mol or more, or 700 g/mol or more, or 750 g/mol or more. In some embodiments, the PAO may have a Mw in the range of from 250 to 10,000 g/mol, or from 400 to 5,000 g/mol, or form 500 to 4,000 g/mol, or from 600 to 2000 g/mol, or from 700 to 1000 g/mol.

Useful PAOs have a kinematic viscosity ("KV") at 100° C., as measured by ASTM D445 at 100° C., of 3 cSt (1 cSt=1 mm$^2$/s) to 3,000 cSt, 4 to 1,000 cSt, 6 to 300 cSt, 8 to 125 cSt, 8 to 100 cSt, or 10 to 60 cSt. In some embodiments, the PAO has a KV at 100° C. of 5 to 1000 cSt, preferably 6 to 300 cSt, preferably 7 to 100 cSt, or 8 to 50 cSt.

Useful PAOs have a kinematic viscosity ("KV") as measured by ASTM D445 at 40° C. of 5.0 to about 500 cSt, about 10 to 300 cSt, or 20 to 200 cSt, or 30 to 100 cSt, or 40 to 80 cSt, or 50 to 75 cSt.

The PAOs may also have a viscosity index ("VI"), as determined by ASTM D2270, of 50 to 400, or 60 to 350, or 70 to 250, or 80 to 200, or preferably 90 to 175, or 100 to 150.

The PAO may have a pour point of −100° C. to 0° C., −100° C. to −10° C., −90° C. to −15° C., −80° C. to −20° C. In some embodiments, the PAO or blend of PAOs has a pour point of −25 to −75° C., preferably −40 to −60° C.

The PAO may have a flash point of 150° C. or more, 200° C. or more, 210° C. or more, 220° C. or more, 230° C. or more, preferably between 240° C. and 290° C.

The PAO may have a specific gravity (15.6/15.6° C., 1 atm/1 atm) of 0.79 to 0.90, preferably 0.80 to 0.89, preferably 0.81 to 0.88, preferably 0.82 to 0.87, 0.83 to 0.86.

Particularly preferred PAOs are those having (a) a flash point of 200° C. or more, 210° C. or more, 220° C. or more, or 230° C. or more; and (b) a pour point less than −20° C., less than −25° C., less than −30° C., less than −35° C., or less than −40° C., and (c) a KV at 100° C. of 2 cSt or more, 4 cSt or more, 5 cSt or more, 6 cSt or more, 8 cSt or more.

Further preferred PAOs have a KV at 100° C. of at least 5 to 50 cSt, particularly 8 to 20 cSt; a pour point of −25 to −75° C., preferably −40 to −60° C.; and a specific gravity of 0.81 to 0.87, preferably 0.82 to 0.86.

The PAO may be comprised of one or more distinct PAO components. In one embodiment, the PAO is a blend of one or more oligomers with different compositions (e.g., different α-olefin(s) were used to make the oligomers) and/or different physical properties (e.g., KV, pour point, VI, and/or T$_g$).

Useful PAOs are available include certain grades of SpectraSyn™ and SpectraSyn Ultra™ available from ExxonMobil Chemical Company (Houston, Tex., USA). Other useful PAOs include certain grades of Synfluid™ available from ChevronPhillips Chemical Company (Pasadena, Tex., USA), Durasyn™ available from Innovene (Chicago, Ill., USA), Nexbase™ available from Neste Oil (Keilaniemi, Finland), and Synton™ available from Chemtura Corporation (Middlebury, Conn., USA).

Blend Compositions

Blend compositions according to the present invention may comprise at least one PBE and at least one PAO. In some embodiments, the blend compositions may comprise one propylene-based elastomer and one PAO, while in other embodiments, the blend composition may comprise a blend of propylene-based elastomers blended with one PAO, or one propylene-based elastomer blended with a blend of PAOs, or blends of propylene-based elastomers blended with a blend of PAOs.

The blend composition may comprise, at least about 0.5 wt % PAO, at least about 1 wt % PAO, at least about 2 wt % PAO, at least about 3 wt % PAO, at least about 4 wt % PAO, at least about 5 wt % PAO, at least about 6 wt % PAO, at least about 7 wt % PAO, at least about 8 wt % PAO, at least about 9 wt % PAO, or at least about 10 wt % PAO, based on the weight of the blend composition. The blend composition may comprise up to about 60 wt % PAO, up to about 55 wt % PAO, up to about 50 wt % PAO, up to about 45 wt % PAO, up to about 40 wt % PAO, up to about 35 wt % PAO, up to about 30 wt % PAO, up to about 25 wt % PAO, or up to about 20 wt % PAO, based on the weight of the blend composition.

In some embodiments the blend composition may comprise from about 0.5 to 60 wt % PAO, from about 1 to 50 wt % PAO, from about 2 to 45 wt % PAO, or from about 5 to 40 wt % PAO. In some embodiments, the blend composition is a lean blend and may comprise from about 0.5 to 20 wt % PAO, from about 1 to 15 wt % PAO, from about 2 to 10 wt % PAO, or from about 5 to 9 wt % PAO. In other embodiments, the blend composition is a concentrated blend and may comprise from about 10 to about 60 wt % PAO, from about 15 to 50 wt % PAO, from about 20 to 45 wt % PAO, or from about 30 to 45 wt % PAO.

The blend composition may have a Shore A hardness, as determined by ASTM-D2240 in the range of from 10 to 200, or from 20 to 150, or from 30 to 100, or from 40 to 75, or from 45 to 65.

The blend composition may have a MFR, as measured according to ASTM D-1238 (2.16 kg weight @ 230° C.), greater than about 0.5 g/10 min, greater than about 1.0 g/10 min, greater than about 1.5 g/10 min, greater than about 2.0 g/10 min, or greater than about 2.5 g/10 min, or greater than about 3 g/10 min, or greater than about 3.5 g/10 min, or greater than about 4 g/10 min. The blend composition may have an MFR less than about 100 g/10 min, less than about 50 g/10 min, less than about 25 g/10 min, less than about 15 g/10 min, less than about 10 g/10 min, less than about 7 g/10 min. In some embodiments, the blend composition may have an MFR from about 0.5 to about 15 g/10 min, from about 1.0 to about 10 g/10 min, or from about 3 to about 7 g/10 min.

The blend composition may have a Vicat softening point, as measured according to ASTM D-1525 (200 g), of from about 10 to 100° C., or from about 20 to about 75° C., or from about 30 to about 60° C., or from about 35 to 50° C.

A variety of additives may be incorporated into the blend compositions described herein, depending upon the intended purpose. For example, when the blends are used to form films, fibers, and nonwoven fabrics, such additives may include but are not limited to stabilizers, antioxidants, fillers, colorants, nucleating agents, dispersing agents, mold release agents, slip agents, fire retardants, plasticizers, pigments, vulcanizing or curative agents, vulcanizing or curative accelerators, cure retarders, processing aids, tackifying resins, and the like. Other additives may include fillers and/or reinforcing materials, such as carbon black, clay, talc, calcium carbonate, mica, silica, silicate, combinations thereof, and the like. Primary and secondary antioxidants include, for example, hindered phenols, hindered amines, and phosphates. Nucleating agents include, for example, sodium benzoate and talc. Also, to improve crystallization rates, other nucleating agents may also be employed such as Ziegler-Nana olefin products or other highly crystalline polymers. Other additives such as dispersing agents, for example, Acrowax C, can also be included. Slip agents include, for example, oleamide and erucamide. Catalyst deactivators are also commonly used, for example, calcium stearate, hydrotalcite, and calcium oxide, and/or other acid neutralizers.

Further, in some exemplary embodiments, additives may be incorporated into the blend compositions directly or as part of a masterbatch, i.e., an additive package containing several additives to be added at one time in predetermined proportions. The masterbatch may be added in any suitable amount to accomplish the desired result. For example, a masterbatch comprising an additive may be used in an amount ranging from about 0.1 to about 10 wt %, or from about 0.25 to about 7.5 wt %, or from about 0.5 to about 5 wt %, or from about 1 to about 5 wt %, or from about 2 to about 4 wt %, based on the total weight of the polymer blend and the masterbatch.

Methods for Preparing the Blend Composition

The blend compositions described herein may be formed by combining the propylene-based elastomer and the poly-alphaolefin, and other optional fillers and additives using any suitable means known in the polymer processing art. Those skilled in the art will be able to determine the appropriate methods to enable intimate mixing while also achieving process economy. For example, the components may be blended in a tumbler, continuous mixer, static mixer, batch mixer, extruder, or a combination thereof that is sufficient to achieve an adequate dispersion of the components.

In some embodiments, the blend composition may be prepared by combining the PBE and PAO components during a process used to fabricate articles, without first making a pelletized version of the composition. For example, the PAO may be added to other components in a production extruder, such as the extruder on an injection molding machine or on a continuous extrusion line, and thereafter directly processed into a film, sheet, fiber, profile, etc.

In other preferred embodiments, the blend composition is prepared by a method that comprises combining the PBE and PAO components and then pelletizing the blend compositions. Without being bound by theory, it is believe that, by pelletizing the blend composition before forming the fabricated article that a more uniform dispersion of the PAO within the PBE is achieved. This in turn allows for a more uniform dispersion of the PAO within the fabricated article, allowing for the improvements in softness of stretch described herein. Therefore, in some embodiments, the fabricated article may be prepared by a method comprising the steps of: (a) combining (i) a propylene-based elastomer comprising at least about 60 wt % propylene-derived units and about 5 to about 25 wt % ethylene-derived units, based on total weight of the propylene-based elastomer and (ii) a polyalphaolefin to form a blend; (b) pelletizing the blend to form a pellet composition; and (c) using the pellet composition to form a fabricated article.

In some embodiments, the PBE and PAO components may be combined in a melt-blending (compounding) step and subsequently pelletizing the blend, using either an underwater pelletizer or a strand-cut approach (i.e., a water batch and dry pelletizer). This approach may involve an on-line "finishing" extruder associated with a polymerization unit, or it may involve an off-line "compounding" extruder dedicated to melt blending.

In some embodiments, the method of blending the components may be to melt-blend the components in a batch mixer, such as a Banbury™ or Brabender™ mixer.

In some embodiments, the method of blending may be to melt blend the components in an extruder, such as a single-screw extruder or a twin-screw extruder. Extrusion technology for polymer blends is well known in the art, and is described in more detail in, for example, PLASTICS EXTRUSION TECHNOLOGY, F. Hensen, Ed. (Hamer, 1988), pp. 26-37, and in POLYPROPYLENE HANDBOOK, E. P. Moore, Jr. Ed. (Hanser, 1996), pp. 304-348.

The PAO may be directly injected into the polymer melt using a liquid injection device at some point along the barrel, as in the case of a twin-screw extruder, or through an opening in a hollow screw shaft, as in the case of a single-screw extruder. PAO is preferably added downstream from the polymer melt zone, but alternatively the PAO can be added at a point where the polymer(s) have not fully melted yet. For example, in a twin-screw extruder, PAO can be injected after the first barrel section (preferably after the first third of the barrel, more preferably in the last third of the barrel). An PAO addition point may be on top of conveying elements of screw, or on top of liquid mixing elements of screw, or prior to kneading elements of screw, or prior to liquid mixing elements of the screw. The extruder may have more than one (preferably two or three) PAO addition points along the barrel or screw shaft. Optionally, the PAO can be added via the extruder feed throat.

The components may also be blended by a combination of methods, such as dry blending followed by melt blending in an extruder, or batch mixing of some components followed by melt blending with other components in an extruder. One or more components may also be blended using a double-cone blender, ribbon blender, or other suitable blender, or in a Farrel Continuous Mixer (FCM™).

Blending may also involve a "masterbatch" approach, where the target PAO concentration is achieved by combining neat propylene-based elastomer(s) and optionally thermoplastic polyolefin(s) and fillers and/or additives with an appropriate amount of pre-blended masterbatch (i.e., a blend of the propylene-based elastomer, PAO, and optionally the thermoplastic polyolefin and the filler and additives that has been previously prepared at a higher concentration of PAO than desired in the final blend). This is a common practice in polymer processing, typically used for addition of color, additives, and fillers to final compositions. Dispersion (or "letdown") of the masterbatch may take place as part of a processing step used to fabricate articles, such as in the extruder on an injection molding machine or on a continuous extrusion line, or during a separate compounding step.

Films Prepared from the Blend Composition

Elastic films may be prepared from the blend compositions described herein. The film may be formed by any number of well-known extrusion or co-extrusion techniques. For example, any of the blown or chill roll techniques are suitable. For example, the blend composition may be extruded in a molten state through a flat die and then cooled. Alternatively, the blend composition may be extruded in a molten state through an annular die and then blown and cooled to form a tubular film. The tubular film may be axially slit and unfolded to form a flat film. The films may be unoriented, uniaxially oriented, or biaxially oriented.

Multiple-layer films may also be formed using methods well known in the art. For example, layer components may be coextruded through a coextrusion feedblock and die assembly to yield a film with two or more layers adhered together, but differing in composition. Multiple-layer films may also be formed by extrusion coating whereby a substrate material is contacted with the hot molten polymer as the polymer exits the die. For instance, an already formed film may be extrusion coated with a layer of the blend compositions described herein as the latter is extruded through the die. Multiple-layer films may also be formed by combining two or more single layer films prepared as described above. The total thickness of multilayer films may vary based upon the application desired. Those of skill in the art will appreciate that the thickness of individual layers for multilayer films may be adjusted based on desired end use performance, polymer compositions employed, equipment capability, and other like factors.

Thus, one embodiment provides a film comprising a blend composition, where the blend composition comprises a PAO and a propylene-based elastomer, where the PAO is present in an amount of at least about 0.5 wt % PAO, or at least about 1 wt % PAO, or at least about 2 wt % PAO, or at least about 3 wt % PAO, or at least about 4 wt % PAO, or at least about 5 wt % PAO, or at least about 6 wt % PAO, or at least about 7 wt % PAO, or at least about 8 wt % PAO, or at least about 9 wt % PAO, or at least about 10 wt % PAO, based on the weight of the blend composition. The blend composition may comprise up to about 60 wt % PAO, or up to about 55 wt % PAO, or up to about 50 wt % PAO, or up to about 45 wt % PAO, or up to about 40 wt % PAO, or up to about 35 wt % PAO, or up to about 30 wt % PAO, or up to about 25 wt % PAO, or up to about 20 wt % PAO, based on the weight of the blend composition. In some embodiments the blend composition may comprise from about 0.5 to 60 wt % PAO, or from about 1 to 50 wt % PAO, or from about 2 to 45 wt % PAO, or from about 5 to 40 wt % PAO. In some embodiments, the blend composition is a lean blend and may comprise from about 0.5 to 20 wt % PAO, or from about 1 to 15 wt % PAO, or from about 2 to 10 wt % PAO, or from about 5 to 9 wt % PAO. In other embodiments, the blend composition is a concentrated blend and may comprise from about 10 to about 60 wt % PAO, or from about 15 to 50 wt % PAO, or from about 20 to 45 wt % PAO, or from about 30 to 45 wt % PAO.

The total thickness of the film may vary based upon the application desired. In some embodiments the total unstretched film thickness is about 1.0-100.0 μm. Typically, elastic films have a thickness of about 5-50 μm in most applications.

A film comprising the blend compositions described herein may have improved properties, such as soft-stretch.

In some embodiments, the film has a first cycle 100% hysteresis of less than 15 mJ/cm, or less than 14, or less than 13, or less than 12. Films with lower hysteresis values are considered to be more elastic.

The film may have improved soft-stretch as compared to films comprising similar propylene-based elastomers but that do not contain the PAO. For example, the film can have a 50% loading stress during a 100% hysteresis cycle at least 15% lower than a similar film composition containing a PBE but that contains no PAO.

In some embodiments, the film has a first-cycle hysteresis loading stress at 100% strain of less than 5 MPa, or less than 3 MPa, or less than 2 MPa.

Fibers and Nonwoven Compositions

The blend compositions described herein may be useful in meltspun (e.g., meltblown or spunbond) fibers and nonwoven compositions (e.g., fabrics). As used herein, "meltspun nonwoven composition" refers to a composition having at least one meltspun layer, and does not require that the entire composition be meltspun or nonwoven. As used herein, "nonwoven" refers to a textile material that has been produced by methods other than weaving. In nonwoven fabrics, the fibers are processed directly into a planar sheet-like fabric structure and then are either bonded chemically, thermally, or interlocked mechanically (or both) to achieve a cohesive fabric.

In certain embodiments, nonwoven compositions comprising the blend compositions may be described as extensible. "Extensible," as used herein, means any fiber or nonwoven composition that yields or deforms (i.e., stretches) upon application of a force. While many extensible materials are also elastic, the term extensible also encompasses those materials that remain extended or deformed upon removal of the force. Fabric layers containing the blends described herein are useful as extensible facing layers in combination with an elastic core layer, which may be a film or a nonwoven layer. When an extensible facing layer is used in combination with an elastic core layer, the extensible layer may permanently deforms when the elastic layer to which it is attached stretches and retracts, creating a wrinkled or textured outer surface with gives an additional soft feel that is particularly suited for articles in which the facing layer is in contact with a wearer's skin.

The fibers and nonwoven compositions of the present invention can be formed by any method known in the art. For example, the nonwoven compositions may be produced by a spunmelt process. In certain embodiments herein, the layer or layers of the nonwoven compositions of the invention are produced by a spunbond process. When the compositions further comprise one or more elastic layers, the elastic layers may be produced by a meltblown process, by a spunbond or spunlace process, or by any other suitable nonwoven process.

Fibers produced from the blend compositions may have a thickness from about 0.5 to about 10 denier, or from about 0.75 to about 8 denier, or from about 1 to about 6 denier, or from about 1 to about 3 denier. Although commonly referred to in the art and used herein for convenience as an indicator of thickness, denier is more accurately described as the linear mass density of a fiber. A denier is the mass (in grams) of a fiber per 9,000 meters. In practice, measuring 9,000 meters may be both time-consuming and wasteful. Usually, a sample of lesser length (i.e., 900 meters, 90 meters, or any other suitable length) is weighed and the result multiplied by the appropriate factor to obtain the denier of the fiber.

The fiber denier (g/9000 m) of a polypropylene-based fiber can be converted to diameter in microns using the following formula:

$$D = 2\sqrt{\frac{denier}{(0.006432)}}$$

Thus, a 1.0 denier polypropylene fiber would have a diameter of about 12.5 micron and a 2.0 denier polypropylene fiber would have a diameter of 17.6 micron.

The fibers may be monocomponent fibers or bicomponent fibers. Preferably, the fibers are monocomponent fibers, meaning that the fibers have a consistent composition throughout their cross-section.

The layer that comprises the blend may have a basis weight of less than 50 g/m² ("gsm"), or less than 40 gsm, or less than 30 gsm, or less than 25 gsm, or less than 20 gsm. The layer that comprises the blend may have a basis weight of from about 1 to about 75 g/m² ("gsm"), or from about 2 to about 50 gsm, or from about 5 to about 35 gsm, or from about 7 to about 25 gsm, or from about 10 to about 25 gsm.

In addition to good extensibility and elongation, fibers comprising the blends described herein may also be used to produce fabrics that have improved aesthetics. For example, the fabrics may have an improved feel and softness. Without being bound by theory, it is believed that fabrics produced using the blends described herein have lower bending modulus, due to lower crystallinity, which improves the softness or feel of the fabric. Fabrics made from fibers comprising the blends described herein may have improved softness, as measured by a Handle-O-Meter.

As used herein, "meltblown fibers" and "meltblown compositions" (or "meltblown fabrics") refer to fibers formed by extruding a molten thermoplastic material at a certain processing temperature through a plurality of fine, usually circular, die capillaries as molten threads or filaments into high velocity, usually hot, gas streams which attenuate the filaments of molten thermoplastic material to reduce their diameter, which may be to microfiber diameter. Thereafter, the meltblown fibers are carried by the high velocity gas stream and are deposited on a collecting surface to form a web or nonwoven fabric of randomly dispersed meltblown fibers. Such a process is generally described in, for example, U.S. Pat. Nos. 3,849,241 and 6,268,203. The term meltblowing as used herein is meant to encompass the meltspray process.

Commercial meltblown processes utilize extrusion systems having a relatively high throughput, in excess of 0.3 grams per hole per minute ("ghm"), or in excess of 0.4 ghm, or in excess of 0.5 ghm, or in excess of 0.6 ghm, or in excess of 0.7 ghm. The nonwoven compositions of the present invention may be produced using commercial meltblown processes, preferably a high pressure meltblown process available from Biax-Fiberfilm Corporation, or in test or pilot scale processes.

In a typical spunbond process, polymer is supplied to a heated extruder to melt and homogenize the polymers. The extruder supplies melted polymer to a spinneret where the polymer is fiberized as passed through fine openings arranged in one or more rows in the spinneret, forming a curtain of filaments. The filaments are usually quenched with air at a low temperature, drawn, usually pneumatically, and deposited on a moving mat, belt or "forming wire" to form the nonwoven composition. See, for example, in U.S. Pat. Nos. 4,340,563; 3,692,618; 3,802,817; 3,338,992; 3,341,394; 3,502,763; and 3,542,615. The term spunbond as used herein is meant to include spunlace processes, in which the filaments are entangled to form a web using high-speed jets of water (known as "hydroentanglement").

Elastic Laminates

The blend compositions described herein may be particularly useful in forming a film layer that is part of an elastic laminate. The elastic laminate may comprise at least one film layer containing the blend composition and at least one nonwoven facing layer. For example, in some embodiments the elastic laminate comprises an inner elastic film layer and two outer nonwoven facing layers. The outer nonwoven facing layers may be made from any polymer that is suitable for forming nonwoven facing layers, and for example may be made from polypropylene, propylene-ethylene copolymers, propylene-based elastomers, polyethylene, polyethylene-terephthalate blends (PET), and blends thereof.

A typical laminate or composite has three or more layers, with the elastic film layer(s) ("F") sandwiched between two or more outer fabric layers that may be spunbonded layers ("S"), meltblown layers ("M"), or spunlace layers ("L").

Examples of laminate combinations include, but are not limited to SFS, MFS, LFL, SFM, SFL, MFL, SSMFMSS, SMFMS, and SMMSS composites. Composites can also be made of the meltblown or spunbond nonwovens of the invention with other materials, either synthetic or natural, to produce useful articles.

The nonwoven laminate composition may comprise one or more elastic film layers comprising a PBE and further comprise one or more nonwoven facing layers as described herein positioned on one or both sides of the elastic layer(s). In some embodiments, the film is made in a first process and then the roll of film is laminated to nonwoven facing layers, for example, by pressing the layers through a nip and using heat and pressure to bond the nonwoven layers to the film layers, or by ultrasonic bonding, or by using a hot melt adhesive. In some embodiments, the nonwoven laminate is made in an extrusion lamination process where the film layer is extruded onto a pre-existing nonwoven fabric layer. In some embodiments, the nonwoven laminate is made by forming the nonwoven layer directly onto the film layer.

The nonwoven products described above may be used in many articles such as hygiene products including, but not limited to, diapers, feminine care products, and adult incontinent products. The nonwoven products may also be used in medical products such as sterile wrap, isolation gowns, operating room gowns, surgical gowns, surgical drapes, first aid dressings, and other disposable items. In particular the nonwoven products may be useful as facing layers for medical gowns, and allow for extensibility in the elbow area of the gown. The nonwoven products may also be useful in disposable protective clothing, and may add toughness to elbow and knee regions of such clothing. The nonwoven products may also be useful as protective wrapping, packaging or wound care. The nonwoven products may also be useful in geotextile applications, as the fabric may have improved puncture resistance in that the fabric will deform instead of puncture.

EXAMPLES

In order to provide a better understanding of the foregoing discussion, the following non-limiting examples are offered. Although the examples may be directed to specific embodiments, they are not to be viewed as limiting the invention in any specific respect. All parts, proportions, and percentages are by weight unless otherwise indicated.

Example 1

The following propylene-based elastomers were used in Example 1. The propylene-based elastomers were metallocene-catalyzed reactor-blended copolymers of two reactor components prepared in two parallel reactors as described herein.

TABLE 1

| | PBE Properties | | | |
|---|---|---|---|---|
| Grade | R1 C2, wt % | R2 C2, wt % | Overall C2, wt % | MFR ($I_2$ at 230° C.) g/10 min |
| PBE-1 | 16.2-18.3 | 3.0-5.0 | 16.0 | 3.0 |
| PBE-2 | 17.0-19.0 | 3.0-5.0 | 16.6 | 3.0 |
| PBE-3 | 12.8-14.8 | 7.4-9.4 | 13.3 | 45.0 |

A pelletized blend composition (Blend-1) was prepared by melt blending PAO-1 and PBE-2 using a 90-mm twin-screw extruder. The extruder barrel temperature settings ranged from 330-360° F. (166-182° C.) with a die temperature of 390° F. (199° C.). The PAO-1 was introduced to the extruder via liquid injection into the extruder barrel upstream of the "mixing zone." The melt was cooled and pelletized using an underwater pelletizer with a water temperature of 50° F. (10° C.). The PAO-1 was a polyalphaolefin as described herein and had the properties described in Table 2. The resulting blend composition (Blend-1) contained 7 wt % PAO-1 and 93 wt % PBE-1.

TABLE 2

| | PAO Properties | | | | | | |
|---|---|---|---|---|---|---|---|
| | SG @ 15.6° C. | KV @ 100° C. | KV @ 40° C. | VI | Pour Point, ° C. | Flash Point (COC) ° C. | Mw |
| PAO-1 | 0.835 | 10.0 cSt | 66 cSt | 137 | −48 | 266 | <1000 g/mole |

The Blend-1 compounded pellet sample and samples of the different PBE's in Table 1 were then converted into film samples using a mini-cast film line. The mini-cast line was equipped with a 1-inch (25.4-mm) extruder that melts and pumps the extrudate through an 8-inch (203-mm) slit die with a 0.015-inch (0.381-mm) die-gap. Upon exiting the die the melt extrudate was drawn-down to a nominal 4-mil (100 µm) thickness and quenched via a polished cast roll. The cast extrusion conditions are listed in Table 3. Film samples were wound on paper to mitigate roll blocking and then cut, conditioned, and subsequently tested. All test specimens were aged for 2-weeks in an ASTM controlled lab prior to testing. The tests and test conditions are listed in Table 4.

TABLE 3

| | Film Extrusion Conditions | | | |
|---|---|---|---|---|
| | PBE-1 | PBE-2 | PBE-3 | Blend-1 |
| Extruder Zone 1 temperature, ° C. | 157 | 156 | 104 | 143 |
| Extruder Zone 2 temperature, ° C. | 178 | 187 | 120 | 164 |
| Extruder Zone 3 temperature, ° C. | 193 | 196 | 126 | 182 |
| Die/adapter temperature, ° C. | 191 | 191 | 121 | 178 |
| Melt temperature, ° C. | 200 | 198 | 129 | 186 |
| Die pressure, MPa | 10 | 12 | 7 | 11 |
| RPM | 119 | 119 | 120 | 120 |
| Line Speed, mpm | 2.9 | 2.9 | 3.0 | 3.0 |
| Cast roll temperature, ° C. | 14 | 14 | 14 | 14 |

TABLE 4

| Test Methods | |
|---|---|
| Test | Method |
| tensile at break, MPa | ASTM D-882 |
| elongation at break, % | ASTM D-882 |
| 100% hysteresis, 2-cycles, 23° C., transverse direction | Described Below |
| 200% hysteresis, 2-cycles, 23° C., transverse direction | Described Below |

The film samples were tested for elastic performance via both 100% and 200% hysteresis cycle testing. Each test specimen was tested 2-cycles at room temperature whereby the specimen were stretched uniaxially at a given cross-head speed to a maximum strain where the stress is immediately removed and allowed to retract or unload at the same cross-head speed. The hysteresis response of each film sample was measured in tension using a grip separation of 2-inches (50.8-mm) and a cross-head speed of 20-inches/minute (508-mm/minute). Test specimens were cut to a dimension of 1×4 inches (2.54×10.16 cm). Test specimens were cut to allow hysteresis cycle testing in the transverse direction or the direction perpendicular to machine direction of film travel during fabrication.

The FIGURE further illustrates response curves and key result parameters reported in the hysteresis cycle testing. The cycle strain is defined as the maximum strain attained during the hysteresis cycle testing. For example, for a 100% cycle, the cycle strain is 100%. The peak stress is defined as the maximum loading stress measured at the cycle strain. The 50% loading stress is defined as the loading stress measured at 50% of the cycle strain. The retractive stress is defined as the unloading stress measured during the unloading portion of the cycle at 50% of the cycle strain. The $1^{st}$-cycle permanent set is defined as the strain upon which the $2^{nd}$-cycle loading reached a nominal load of 4 $g_f$. Hysteresis is defined as the area inside of the hysteresis curve and represents the amount of applied energy lost or the amount of unrecoverable energy per initial gauge length. The lower the permanent set and hysteresis value, the more elastic is the material. Table 5 lists the test results.

TABLE 5

| Film Properties | | | | |
|---|---|---|---|---|
| | PBE-1 | PBE-2 | PBE-3 | Blend-1 |
| MD tensile at break, MPa | 10.6 | 10.4 | 11.7 | 10.3 |
| TD tensile at break, MPa | 9.1 | 10.3 | 12.7 | 11.6 |
| MD elongation at break, % | 541 | 385 | 670 | 402 |
| TD elongation at break, % | 678 | 804 | 898 | 932 |
| 100% hysteresis, 23° C., TD $1^{st}$ cycle | | | | |
| 50% loading stress, MPa | 1.9 | 2.1 | 2.6 | 1.6 |
| peak stress, MPa | 2.1 | 2.3 | 2.7 | 1.9 |
| 50% retractive stress, MPa | 0.9 | 1.1 | 1.0 | 0.9 |
| hysteresis, mJ/cm | 15 | 16 | 25 | 11 |
| permanent set, % | 7 | 8 | 8 | 5 |
| 200% hysteresis, 23° C., TD $1^{st}$ cycle | | | | |
| 50% loading stress, MPa | 2.1 | 2.0 | 2.6 | 1.7 |
| peak stress, MPa | 2.4 | 2.2 | 2.7 | 1.9 |
| 50% retractive stress, MPa | 0.9 | 0.9 | 0.7 | 0.7 |
| hysteresis, mJ/cm | 39 | 38 | 62 | 32 |
| permanent set, % | 15 | 16 | 22 | 17 |

As shown in Table 5, the 50% loading stress of the Blend-1 is approximately 24% lower than the PBE-2 during the 100% hysteresis cycle and approximately 15% lower than the PBE-2 during the 200% hysteresis cycle. The peak stress of each is also 17% and 14% lower than PBE-2, respectively. The 50% loading stress and peak stress of Blend-1 films was also lower than the stresses of the PBE-1 and PBE-3 films.

Therefore, the film made with Blend-1 exhibited a lower stress response without sacrificing elasticity as shown by hysteresis and permanent set for both the 100% and 200% cycle testing. In fact, the hysteresis was lower in both cases for the Blend-1 film composition. Thus, the Blend-1 film composition exhibited softer stretch relative to the PBE-1, PBE-2, and PBE-3 films without sacrificing overall tensile strength.

Example 2

Films made from Blend-1 compounded pellet samples were also compared to films made with ethylene-octene block copolymers. The ethylene-octene block copolymers used to make the films are commercially available from The Dow Chemical Company as Infuse 9507 ("EOBC-1") and Infuse 9107 ("EOBC-2"). Properties of the ethylene-octene block copolymers are described in Table 6.

TABLE 6

| Ethylene-Octene Block Copolymer | | |
|---|---|---|
| Grade | Density, g/cm$^3$ | Melt Index (I$_2$@190° C.),g/10 min |
| EOBC-1 | 0.866 | 5.0 |
| EOBC-2 | 0.866 | 1.0 |

Sample films were made using a mini-cast film line as described above with reference to Example 1. The cast extrusion conditions are listed in Table 7. The film of the Blend-1 sample was made as described above with reference to Example 1. The film samples were then wound on paper to mitigate roll blocking and then cut, conditioned, and subsequently tested. All test specimens were aged for 2-weeks in an ASTM controlled lab prior to testing. The test results are listed in Table 8.

TABLE 7

| Film Extrusion Conditions | | |
|---|---|---|
| | EOBC-1 | EOBC-2 |
| Extruder Zone 1 temperature, ° C. | 148 | 162 |
| Extruder Zone 2 temperature, ° C. | 163 | 183 |
| Extruder Zone 3 temperature, ° C. | 177 | 197 |
| Die/adapter temperature, ° C. | 177 | 205 |
| Melt temperature, ° C. | 183 | 199 |
| Die pressure, MPa | 6 | 13 |
| RPM | 119 | 121 |
| Line Speed, mpm | 2.9 | 2.9 |
| Cast roll temperature, ° C. | 14 | 14 |

TABLE 8

Film Properties

|  | EOBC-1 | EOBC-2 | Blend-1 |
|---|---|---|---|
| MD tensile at break, MPa | 9.5* | 10.5 | 10.3 |
| TD tensile at break, MPa | 5.3* | 13.0 | 11.6 |
| MD elongation at break, % | 1245* | 539 | 402 |
| TD elongation at break, % | 1252* | 1104 | 932 |
| 100% hysteresis, 23° C., TD 1$^{st}$ cycle | | | |
| 50% loading stress, MPa | 1.4 | 1.6 | 1.6 |
| peak stress, MPa | 1.6 | 1.9 | 1.9 |
| 50% retractive stress, MPa | 0.9 | 1.0 | 0.9 |
| hysteresis, mJ/cm | 9 | 16 | 11 |
| permanent set, % | 7 | 7 | 5 |
| 200% hysteresis, 23° C., TD 1$^{st}$ cycle | | | |
| 50% loading stress, MPa | 1.7 | 1.8 | 1.7 |
| peak stress, MPa | 1.9 | 2.0 | 1.9 |
| 50% retractive stress, MPa | 0.7 | 0.8 | 0.7 |
| hysteresis, mJ/cm | 30 | 30 | 32 |
| permanent set, % | 17 | 16 | 17 |

*sample had no-break response, the value reported is the maximum measured value.

As shown in Table 8, films made with Blend-1 had comparable 50% loading stress during the 100% hysteresis cycle and during the 200% hysteresis cycles as compared to films made with ethylene-octene block copolymers. However, as the films made with Blend-1 are propylene based they would be expected to have greater compatibility with propylene-based nonwoven fabric layers. Therefore, Blend-1 film composition can be used as replacements for ethylene-octene block copolymer films, as they exhibit comparable soft stretch relative to the EOBC-1 and EOBC-2, while having improved compatibility with propylene-based nonwonven fabrics.

Having described the various aspects of the compositions herein, further specific embodiments of the invention include those set forth in the following paragraphs.

Embodiment A

A film comprising a blend of from about 0.5 to about 60 wt % of a polyalphaolefin and 40 to 99.5 wt % of a propylene-based elastomer, where the propylene-based polymer elastomer is a reactor blend of a first polymer component and a second polymer component, wherein the first polymer component comprises propylene and an α-olefin and has an α-olefin content $R_1$ of from greater than 5 to less than 30 wt % α-olefin, where the percentage by weight is based upon the total weight of the propylene-derived and α-olefin derived units of the first polymer component, and wherein the second polymer component comprises propylene and α-olefin and has an α-olefin content $R_2$ of from greater than 1 to less than 10 wt % α-olefin, where the percentage by weight is based upon the total weight of the propylene-derived and α-olefin derived units of the second polymer component.

Embodiment B

The film of Embodiment A, wherein the total α-olefin content of the propylene-based elastomer is from 5 to 30 wt % α-olefin, where the percentage by weight is based upon the total weight of the propylene-derived and α-olefin derived units of the propylene-based elastomer.

Embodiment C

The film of any one of Embodiments A to B, wherein the propylene-based elastomer has a heat of fusion less than about 75 J/g.

Embodiment D

The film of any one of Embodiments A to C, wherein the propylene-based elastomer has a melt temperature less than or equal to about 120° C.

Embodiment E

A film layer comprising a blend of a propylene-based elastomer and a polyalphaolefin, wherein the propylene-based elastomer comprises propylene and from 5 to 30 wt % of an α-olefin and wherein the propylene-base elastomer has a heat of fusion of less than about 75 J/g and a melt temperature of less than or equal to 120° C., and wherein the polyalphaolefin has a kinematic viscosity (KV) at 100° C. of from 3 to 3000 cSt.

Embodiment F

The film of Embodiment E, where the propylene-base elastomer is a reactor blend of a first polymer component and a second polymer component, wherein the first polymer component comprises propylene and an α-olefin and has an α-olefin content $R_1$ of from greater than 5 to less than 30 wt % α-olefin, where the percentage by weight is based upon the total weight of the propylene-derived and α-olefin derived units of the first polymer component, and wherein the second polymer component comprises propylene and α-olefin and has an α-olefin content $R_2$ of from greater than 1 to less than 10 wt % α-olefin.

Embodiment G

The film of any one of Embodiments A to F, wherein the first polymer component has an α-olefin content $R_1$ of from 10 to 25 wt % α-olefin.

Embodiment H

The film of any one of Embodiments A to G, wherein the second polymer component has an α-olefin content $R_2$ of from greater than 2 to less than 8 wt % α-olefin.

Embodiment I

The film of any one of Embodiments A to H, wherein the propylene-based elastomer comprises from 1 to 25 wt % of the second polymer component and from 75 to 99 wt % of the first polymer component, based on the weight of the propylene-based polymer composition.

Embodiment J

The film of any one of Embodiments A to I, wherein the propylene-based elastomer has a triad tacticity greater than about 75%.

Embodiment K

The film of any one of Embodiments A to J, wherein the α-olefin of the first reactor component is ethylene.

Embodiment L

The film of any one of Embodiments A to K, wherein the α-olefin of the second reactor component is ethylene.

Embodiment M

The film of any one of Embodiments A to L, wherein the polyalphaolefin comprises oligomers of α-olefins having from 5 to 24 carbon atoms.

Embodiment N

The film of any one of Embodiments A to M, wherein the polyalphaolefin comprises oligomers of 1-octene, 1-decene, 1-dodecene, and blends thereof.

Embodiment O

The film of any one of Embodiments A to N, wherein the polyalphaolefin has a weight average molecular weight (Mw) of less than 5,000 g/mole.

Embodiment P

The film of any one of Embodiments A to 0, wherein the polyalphaolefin has a kinematic viscosity (KV) at 100° C. of from 3 to 3000 cSt.

Embodiment Q

The film of any one of Embodiments A to P, wherein the polyalphaolefin has a kinematic viscosity (KV) at 100° C. of from 5 to 1000 cSt.

Embodiment R

The film of any one of Embodiments A to Q, wherein the polyalphaolefin has a kinematic viscosity (KV) at 100° C. of from 5 to 100 cSt.

Embodiment S

The film of any one of Embodiments A to R, wherein the film comprises 1 to about 40 wt % of the polyalphaolefin and 60 to 99 wt % of the propylene-based elastomer.

Embodiment T

The film of any one of Embodiments A to S, wherein the film comprises 1 to 20 wt % of the polyalphaolefin and 80 to 99 wt % of the propylene-based elastomer.

Embodiment U

The film of any one of Embodiments A to T, wherein the film consists essentially of the polyalphaolefin and the propylene-based elastomer.

Embodiment V

The film of any one of Embodiments A to U, wherein the film further comprises a polymer that comprises polyethylene, polypropylene, HDPE, LDPE, random copolymers of polypropylene, propylene-based elastomers, or blends thereof.

Embodiment W

The film of any one of Embodiments A to V, wherein the film has a first-cycle hysteresis loading stress at 100% strain of less than 5 MPa.

Embodiment X

The film of any one of Embodiments A to W, wherein the film has a first-cycle hysteresis loading stress at 100% strain of less than 3 MPa.

Embodiment Y

The film of any one of Embodiments A to X, wherein the film has a first-cycle hysteresis loading stress at 100% strain of less than 2 MPa.

Embodiment Z

A laminate composition comprising at least one elastic film layer, wherein the elastic film layer is the film of any one of Embodiments A to Y.

Embodiment AA

The laminate of Embodiment Z, wherein the laminate composition further comprises one or more nonwoven facing layers disposed on either side of the elastic layer.

Embodiment AB

The laminate of Embodiment Z or Embodiment AA, wherein the nonwoven layer comprises spunlace, spunbond, or meltblown nonwoven layers.

Embodiment AC

A process for making a film composition comprising:
(a) melting a pelletized blend composition comprising blend of from about 0.5 to about 60 wt % of a polyalphaolefin and 40 to 99.5 wt % of a propylene-based elastomer,
where the propylene-based polymer elastomer is a reactor blend of a first polymer component and a second polymer component, wherein the first polymer component comprises propylene and an α-olefin and has an α-olefin content $R_1$ of from greater than 5 to less than 30 wt % α-olefin, where the percentage by weight is based upon the total weight of the propylene-derived and α-olefin derived units of the first polymer component, and wherein the second polymer component comprises propylene and α-olefin and has an ethylene content $R_2$ of from greater than 1 to less than 10 wt % α-olefin, where the percentage by weight is based upon the total weight of the propylene-derived and α-olefin derived units of the second polymer component, and
(b) extruding the melt to form a film.

Embodiment AD

The film of any one of Embodiments A to Y, wherein the films is coextruded with at least one additional layer.

Embodiment AE

The film of Embodiment AD, wherein the coextruded film comprises three layers, wherein the middle layer comprises the propylene-based elastomer and polyalphaolefin blend.

Embodiment AF

The film of any one of Embodiments AD to AE where the additional outer layers comprises polyethylene, polypropylene, HDPE, LDPE, random copolymers of polypropylene, propylene-based elastomers, or blends thereof.

For purposes of convenience, various specific test procedures are identified above for determining certain properties. However, when a person of ordinary skill reads this patent and wishes to determine whether a composition or polymer has a particular property identified in a claim, then any published or well-recognized method or test procedure can be followed to determine that property, although the specifically identified procedure is preferred. Each claim should be construed to cover the results of any of such procedures, even to the extent different procedures can yield different results or measurements. Thus, a person of ordinary skill in the art is to expect experimental variations in measured properties that are reflected in the claims.

Certain embodiments and features have been described using a set of numerical upper limits and a set of numerical lower limits. It should be appreciated that ranges from any lower limit to any upper limit are contemplated unless otherwise indicated. All numerical values are "about" or "approximately" the indicated value, and take into account experimental error and variations that would be expected by a person having ordinary skill in the art.

As used herein, the phrases "substantially no," and "substantially free of" are intended to mean that the subject item is not intentionally used or added in any amount, but may be present in very small amounts existing as impurities resulting from environmental or process conditions.

To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A film comprising a blend of from about 0.5 to about 60 wt % of a polyalphaolefin and 40 to 99.5 wt % of a propylene-based elastomer,
    where the propylene-based polymer elastomer is a reactor blend of a first polymer component and a second polymer component, wherein the first polymer component comprises propylene and an α-olefin and has an α-olefin content $R_1$ of from greater than 5 to less than 30 wt % α-olefin, where the percentage by weight is based upon the total weight of the propylene-derived and α-olefin derived units of the first polymer component, and wherein the second polymer component comprises propylene and α-olefin and has an α-olefin content $R_2$ of from greater than 1 to less than 10 wt % α-olefin, where the percentage by weight is based upon the total weight of the propylene-derived and α-olefin derived units of the second polymer component, wherein the propylene-based elastomer has a melt temperature less than or equal to about 120° C.

2. The film of claim 1, wherein the total α-olefin content of the propylene-based elastomer is from 5 to 30 wt % α-olefin, where the percentage by weight is based upon the total weight of the propylene-derived and α-olefin derived units of the propylene-based elastomer.

3. The film of claim 1, wherein the first polymer component has an α-olefin content $R_1$ of from 10 to 25 wt % α-olefin.

4. The film of claim 1, wherein the second polymer component has an α-olefin content $R_2$ of from greater than 2 to less than 8 wt % α-olefin.

5. The film of claim 1, wherein the propylene-based elastomer comprises from 1 to 25 wt % of the second polymer component and from 75 to 99 wt % of the first polymer component, based on the weight of the propylene-based elastomer.

6. The film of claim 1, wherein the propylene-based elastomer has a triad tacticity greater than about 75%.

7. The film of claim 1, wherein the propylene-based elastomer has a heat of fusion less than about 75 J/g.

8. The film of claim 1, wherein the α-olefin of the first reactor component is ethylene.

9. The film of claim 1, wherein the α-olefin of the second reactor component is ethylene.

10. The film of claim 1, wherein the polyalphaolefin comprises oligomers of α-olefins having from 5 to 24 carbon atoms.

11. The film of claim 1, wherein the polyalphaolefin comprises oligomers of 1-octene, 1-decene, 1-dodecene, and blends thereof.

12. The film of claim 1, wherein the polyalphaolefin has a weight average molecular weight (Mw) of less than 5,000 g/mole.

13. The film of claim 1, wherein the polyalphaolefin has a kinematic viscosity (KV) at 100° C. of from 3 to 3000 cSt.

14. The film of claim 1, wherein the polyalphaolefin has a kinematic viscosity (KV) at 100° C. of from 5 to 1000 cSt.

15. The film of claim 1, wherein the polyalphaolefin has a kinematic viscosity (KV) at 100° C. of from 5 to 100 cSt.

16. The film of claim 1, wherein the film comprises 1 to about 40 wt % of the polyalphaolefin and 60 to 99 wt % of the propylene-based elastomer.

17. The film of claim 1, wherein the film comprises 1 to 20 wt % of the polyalphaolefin and 80 to 99 wt % of the propylene-based elastomer.

18. The film of claim 1, wherein the film consists essentially of the polyalphaolefin and the propylene-based elastomer.

19. The film of claim 1, wherein the film has a first-cycle hysteresis loading stress at 100% strain of less than 5 MPa.

* * * * *